(12) United States Patent
Clute et al.

(10) Patent No.: US 11,306,678 B1
(45) Date of Patent: Apr. 19, 2022

(54) PISTON DESIGN FEATURE TO MINIMIZE PERIODIC SECOND LAND PRESSURE VARIATION

(71) Applicant: Caterpillar Inc., Peoria, IL (US)

(72) Inventors: Adam Joseph Clute, Lafayette, IN (US); Scott David Perkins, Mapleton, IL (US); Thomas Randall McClure, Washington, IL (US); Michael R. Bochart, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/095,488

(22) Filed: Nov. 11, 2020

(51) Int. Cl.
*F02F 3/00* (2006.01)
*F02F 1/20* (2006.01)

(52) U.S. Cl.
CPC . *F02F 3/00* (2013.01); *F02F 1/20* (2013.01)

(58) Field of Classification Search
CPC .......................................................... F02F 1/20
USPC ..................................................... 123/193.6
See application file for complete search history.

(56) References Cited

U.S. PATENT DOCUMENTS

| 2013/0133610 | A1 | 5/2013 | Gniesmer |
| 2015/0233321 | A1 | 8/2015 | Gniesmer |
| 2017/0173665 | A1 | 6/2017 | Gniesmer |
| 2017/0284331 | A1* | 10/2017 | Mendes de Araujo .. F16J 9/203 |
| 2018/0100465 | A1* | 4/2018 | Kim ...................... F02F 3/0015 |
| 2019/0063365 | A1* | 2/2019 | Miller ................... F02F 3/0084 |

FOREIGN PATENT DOCUMENTS

| CN | 104421037 A | 3/2015 |
| JP | 2007332930 A | 12/2007 |

\* cited by examiner

*Primary Examiner* — Yi-Kai Wang
(74) *Attorney, Agent, or Firm* — Law Office of Kurt J. Fugman LLC

(57) ABSTRACT

A piston includes an annular body including a crown portion defining a longitudinal axis, a radial direction perpendicular to the longitudinal axis, and a circumferential direction. The crown portion includes a top squish surface, and a circumferential annular wall extending downwardly axially from the top squish surface as well as a skirt. A first piston ring receiving groove is spaced away from the top squish surface, an upper land and a lower land extend from the first piston ring receiving groove, and a bottom blend connects the lower land to the first piston ring receiving groove.

17 Claims, 8 Drawing Sheets

PISTON DESIGN FEATURE TO MINIMIZE PERIODIC SECOND LAND PRESSURE VARIATION

TECHNICAL FIELD

The present disclosure relates generally to pistons that are used in internal combustion engines having piston ring grooves and lands between these grooves. More specifically, the present disclosure relates to a piston having a design feature that may minimize second land pressure variation.

BACKGROUND

Internal combustion engines are routinely used in various industries to power machines and equipment. Examples of industries using such machines and equipment include marine, earth moving, construction, mining, locomotive and agriculture industries, etc. In certain markets and market segments, internal combustion engines that run cleaner, more efficiently, and with less maintenance are required.

More specifically, it often necessary to replace piston rings since as they wear, problems with the engine may occur. In compression ignition engines, load induced rapid combustion (hereinafter referred to as LIRC, is a phenomenon that is similar to knock in gas engines) may occur as well as higher emissions from oil burning, higher oil consumption, and increased piston deposits.

CN104421037A discloses a piston with a land having material removed (see FIG. 2). This creates a void that may trap debris or the like over time.

As can be seen, the piston design of CN104421037A does not suitably address the concerns regarding reduced maintenance, etc.

SUMMARY OF THE DISCLOSURE

A piston that is configured to reciprocate in the bore of an engine according to an embodiment of the present disclosure is provided. The piston may comprise an annular body including a crown portion defining a longitudinal axis, a radial direction perpendicular to the longitudinal axis, and a circumferential direction. The annular body may include a top squish surface of the crown portion, a circumferential annular wall extending downwardly axially from the top squish surface, and a skirt extending downwardly axially from the circumferential annular wall. The circumferential annular wall may define a first groove that is spaced axially away from the top squish surface, forming a first land, and a second groove spaced axially away from the first groove, forming a second land. A bottom blend extends axially, and radially from the second groove.

A piston that is configured to reciprocate in the bore of an engine according to another embodiment of the present disclosure is provided. The piston may comprise an annular body including a crown portion defining a longitudinal axis, a radial direction perpendicular to the longitudinal axis, and a circumferential direction. The annular body may include a top squish surface of the crown portion, a circumferential annular wall extending downwardly axially from the top squish surface, and a skirt extending downwardly axially from the circumferential annular wall. The circumferential annular wall defines a first groove that is spaced axially away from the top squish surface, forming a first land, and a second groove spaced axially away from the first groove, forming a second land. A first blend extends axially, and radially from the second groove.

A piston that is configured to reciprocate in the bore of an engine according to yet another embodiment of the present disclosure is provided. The piston may comprise an annular body including a crown portion defining a longitudinal axis, a radial direction perpendicular to the longitudinal axis, and a circumferential direction. The annular body may also include a top squish surface of the crown portion, a circumferential annular wall extending downwardly axially from the top squish surface, and a skirt extending downwardly axially from the circumferential annular wall. The circumferential annular wall may define a first piston ring receiving groove that is spaced away from the top squish surface, an upper land that extends from the first piston ring receiving groove, and a lower land that extends from the first piston ring receiving groove. A bottom blend may connect the lower land to the first piston ring receiving groove.

DETAILED DESCRIPTION

Figure 1:
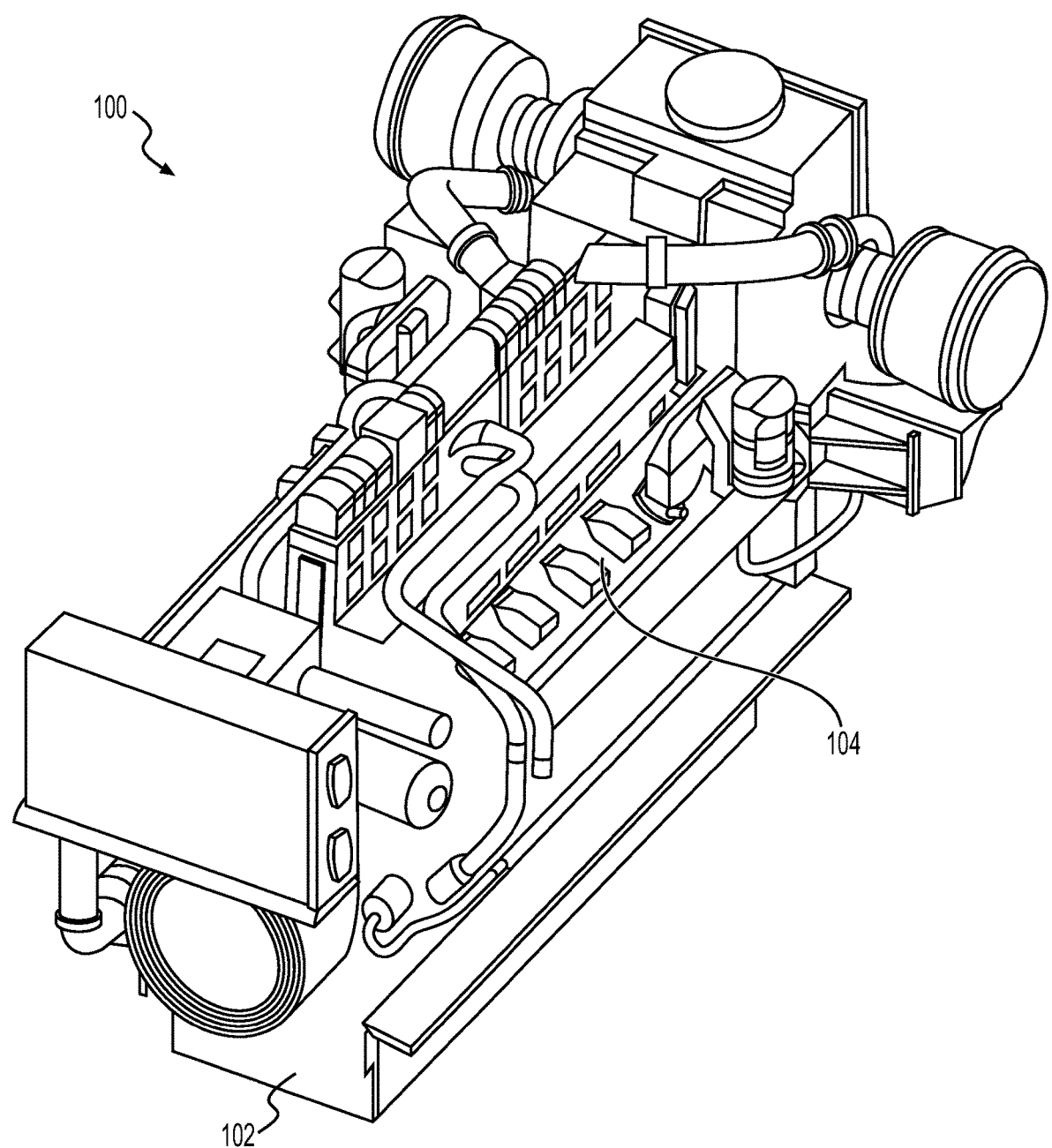
FIG. 1 is a perspective view of an internal combustion engine that may employ pistons according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

Various embodiments of a piston that may be used in an internal combustion engine according to various embodiments of the present disclosure will now be described. More particularly, removal of corner material at the bottom of a groove and/or at a top of a groove may reduce the variation of the effective gap area for when the piston is on the thrust or anti-thrust side, allowing for more consistent second land pressure at critical times of the engine's cycle.

For example, an internal combustion engine 100 is shown in FIG. 1 that may employ various embodiments of the piston constructed according to the principles set forth herein. The engine 100 may include an engine block 102 in which the piston (not shown) reciprocates, and a cylinder head 104 that may contain various engine components for the introduction of fluids into the bore/combustion chamber located in the engine block 102.

Figure 2:
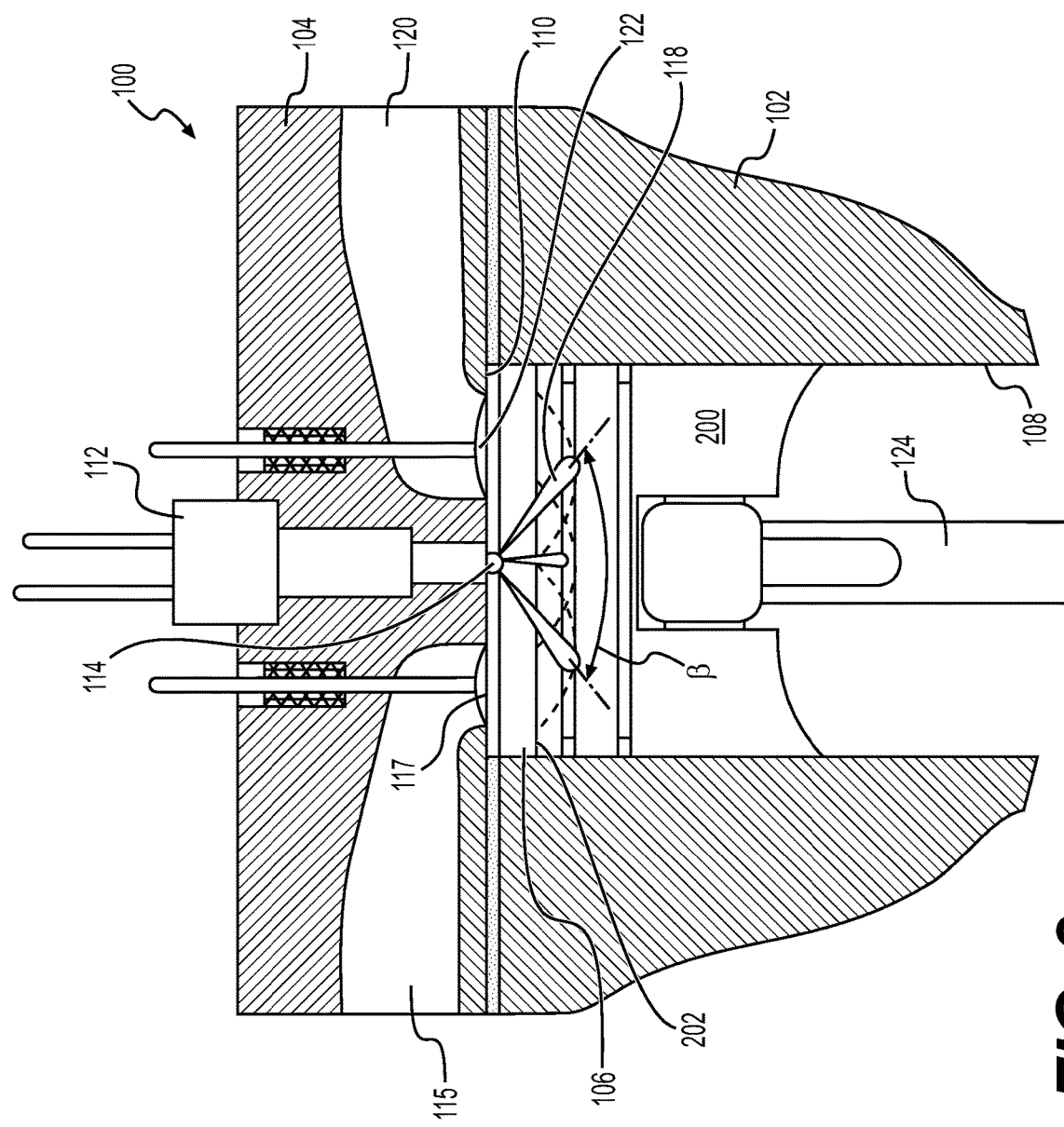
FIG. 2 is a sectioned side view of the internal combustion engine of FIG. 1, showing a piston according to an embodiment of the present disclosure that is disposed in a cylinder bore for reciprocating movement therein.

Turning to FIG. 2, a portion of the engine 100 is shown sectioned, revealing the combustion chamber 106 that may have a generally cylindrical shape that is defined within a cylinder bore 108 formed within the crankcase or engine block 102 of the engine 100. The combustion chamber 106 is further defined at one end by a flame deck surface 110 of the cylinder head 104, and at another end by a crown portion 202 of a piston 200 that is reciprocally disposed within the bore 108, and is connected to a connecting rod 124, which in turn is connected to a crank shaft (not shown). A fuel injector 112 is mounted in the cylinder head 104. The injector 112 has a tip 114 that protrudes within the combustion chamber 106 through the flame deck surface 110 such that it can directly inject fuel into the combustion chamber 106.

During operation of the engine 100, air is admitted into the combustion chamber 100 via an air inlet passage 115 when one or more intake valves 117 (one shown) are open during an intake stroke. In a known configuration, high pressure fuel is permitted to flow through nozzle openings (referred to later herein as holes) in the tip 114 to form fuel jets that enter the combustion chamber 106. Each nozzle opening creates a fuel jet 118 that generally disperses to create a predetermined fuel/air mixture, which in a compression ignition engine auto-ignites and combusts. The fuel jets 118 may be provided from the injector at an included angle $\beta$ of between 110 and 150 degrees, but other angles may also be used. Following combustion, exhaust gas is expelled from the combustion chamber through an exhaust conduit 120 when one or more exhaust valves 122 (one shown) is/are open during an exhaust stroke.

The uniformity and extent of fuel/air mixing in the combustion cylinder is relevant to the combustion efficiency as well as to the amount and type of combustion byproducts that are formed. For example, fuel-rich mixtures, which may be locally present within the combustion chamber 106 during a combustion event due to insufficient mixing, may lead to higher soot emissions and lower combustion efficiency.

Looking at FIGS. 3 thru 6, a piston 200, 300 that configured that is configured to reciprocate in the bore 108 of an engine 100 (such as FIG. 2), and that is constructed generally according to the principles of the present disclosure will now be discussed.

Figure 3:
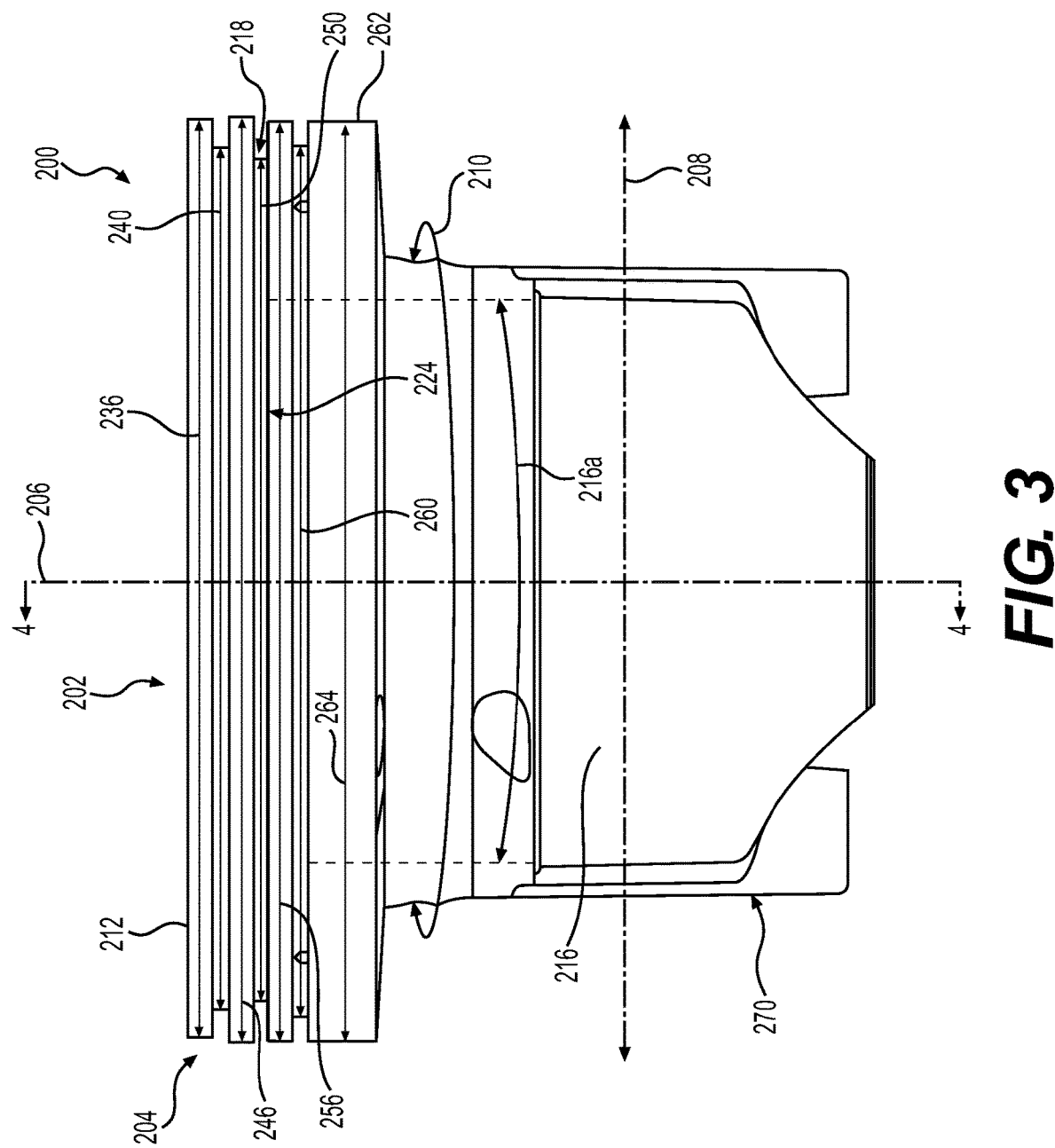
FIG. 3 is a front view of a piston that may be used in the engine of FIGS. 1 and 2 including a chamfered groove according to an embodiment of the present disclosure. The skirt on the thrust or anti-thrust side of the piston is also shown.
Figure 5:
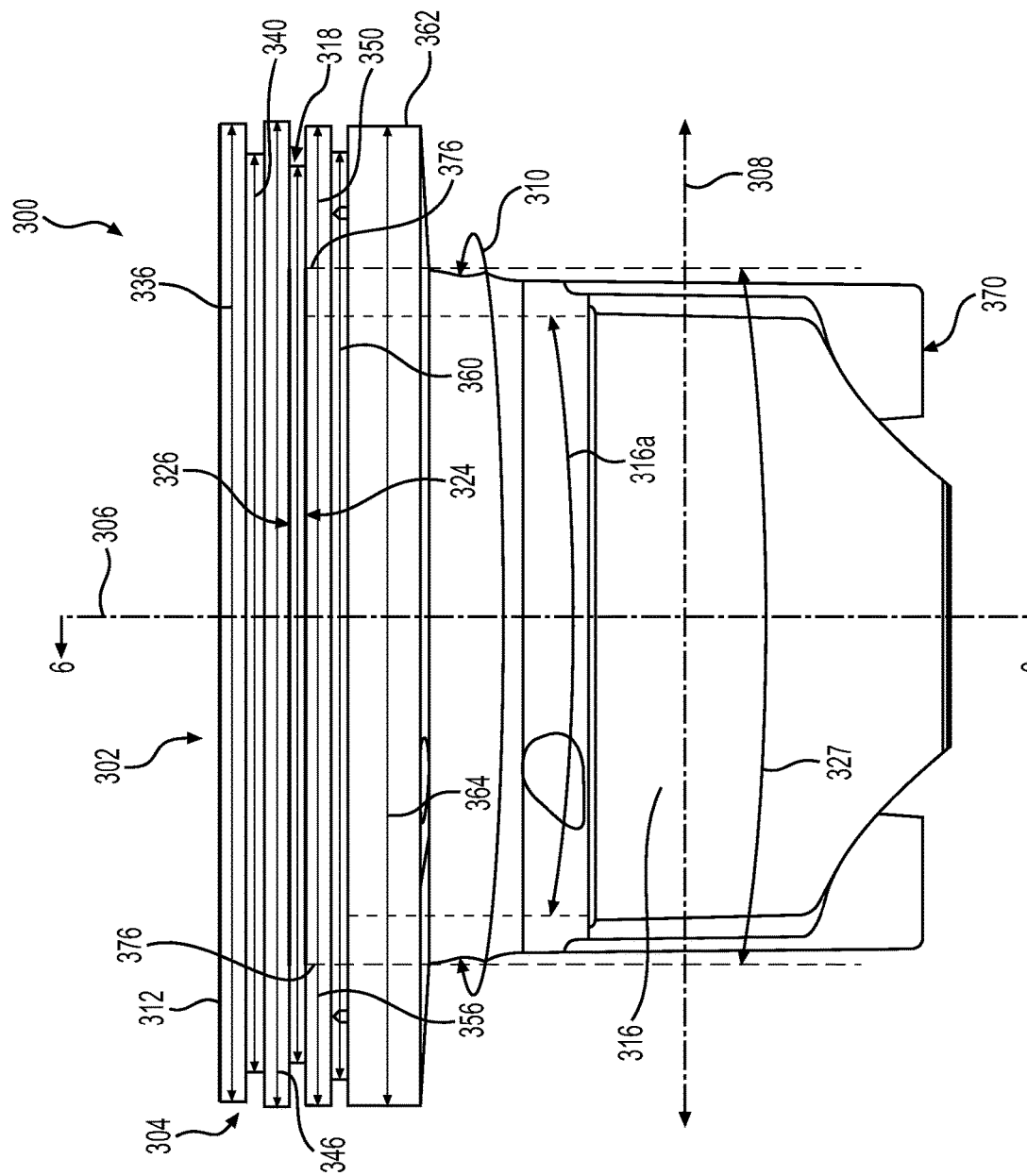
FIG. 5 is a front view of a piston that may be used in the engine of FIGS. 1 and 2 including a chamfered groove according to another embodiment of the present disclosure. The skirt on the thrust or anti-thrust side of the piston is also shown.

Starting with FIGS. 3 and 5, the piston 200, 300 may comprise an annular body 202, 302 (e.g. cylindrical, conical, etc.) including a crown portion 204, 304 defining a longitudinal axis 206, 306, a radial direction 208, 308 that is perpendicular to the longitudinal axis 206, 306, and a circumferential direction 210, 310.

The crown portion 204, 304 may include a top squish surface 212, 312 and a circumferential annular wall 214, 314 (see FIGS. 4 and 6) extending downwardly axially from the top squish surface 212, 312, and a skirt 216, 316 (see FIGS. 3 and 5) extending downwardly axially from the circumferential annular wall 214, 314. In use, this skirt would typically be facing the thrust side or the anti-thrust side of the cylinder bore.

Figure 4:
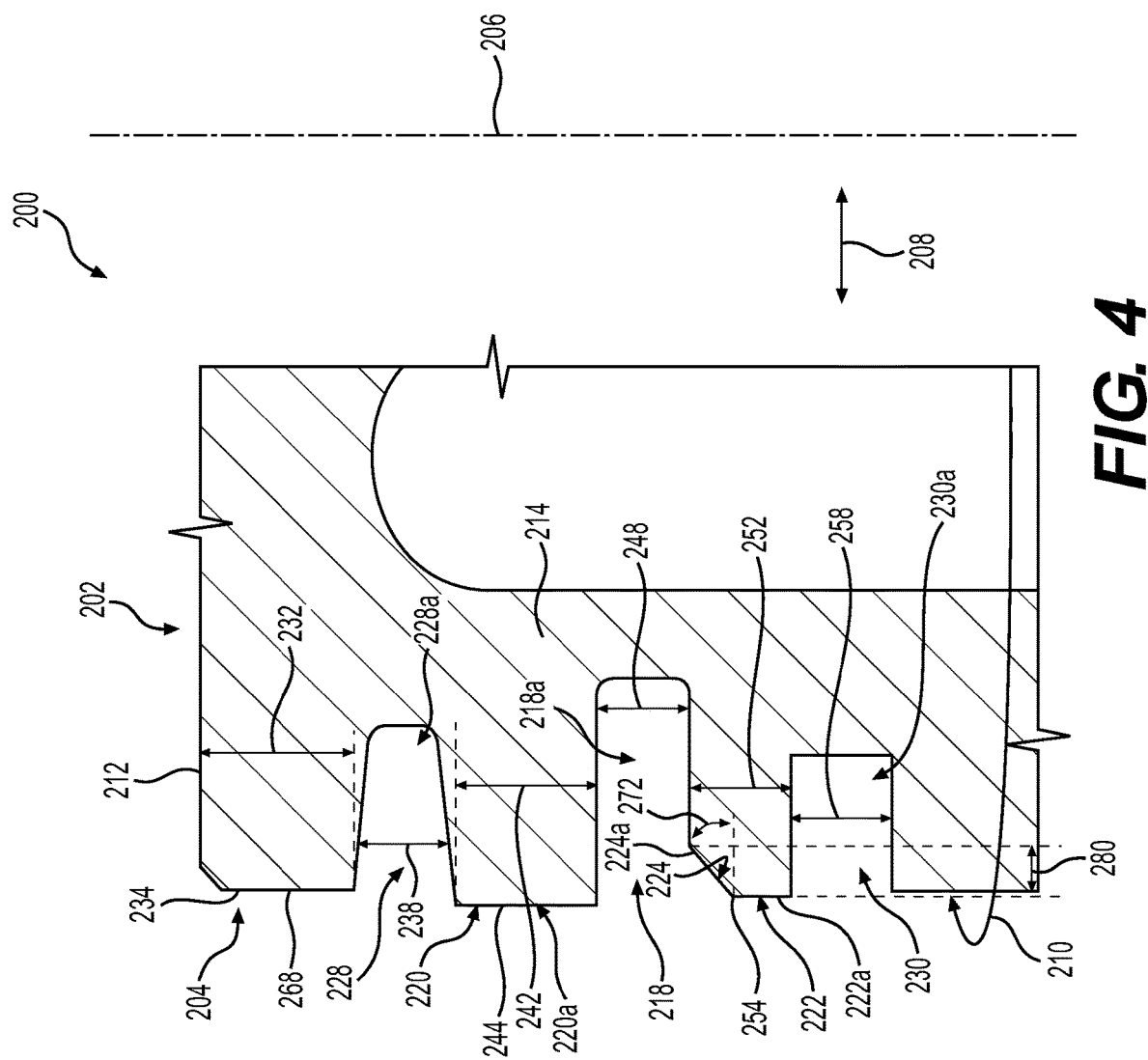
FIG. 4 is an enlarged front sectional view of the piston of FIG. 3 taken along lines 4-4 thereof, illustrating the geometry of the chamfered groove more clearly.
Figure 6:
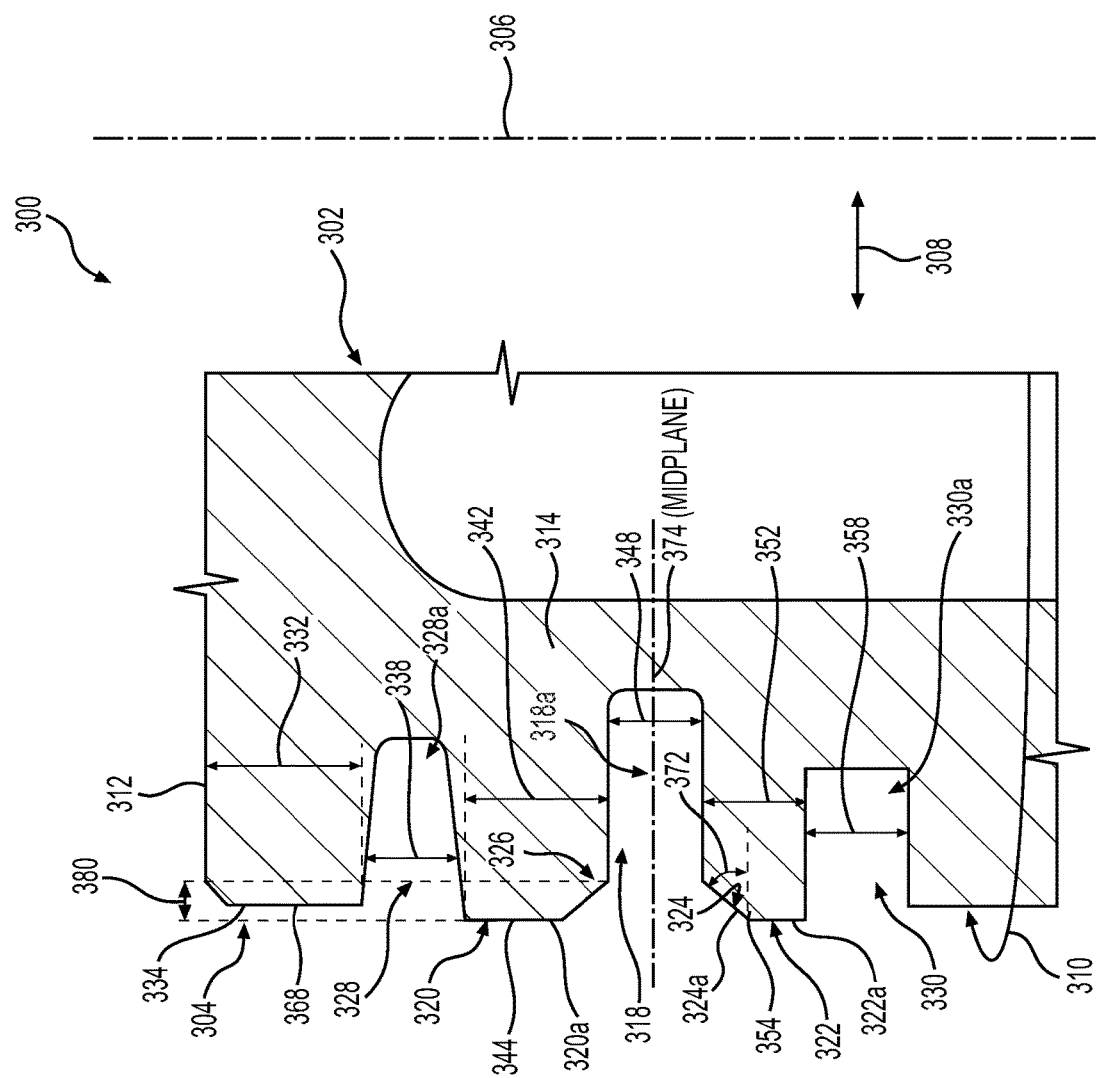
FIG. 6 is an enlarged front sectional view of the piston of FIG. 5 taken along lines 6-6 thereof, illustrating the geometry of the double chamfered groove more clearly.

To prevent blow by during a combustion cycle, the crown portion 204, 304 includes a first piston ring receiving groove 218, 318 that is spaced axially away from the top squish surface 212, 312. It is to be understood that a piston ring would be present in this groove in operation but is not shown in the drawings for clarity. As best seen in FIGS. 4 and 6, an upper land 220, 320 extends axially upwardly from the first piston ring receiving groove 218, 318, and a lower land 222, 322 extends axially downwardly from the first piston ring receiving groove 218, 318.

In order to reduce land pressures, etc., at least a bottom blend 224, 324 (may be any transitional surface such as a conical surface, a constant blend, a variable blend as known in computer added drafting software, an arcuate surface, etc.) connecting the lower land 222, to the first piston ring receiving groove 218, 318 is provided. More specifically, the bottom blend 224, 324 may take the form of a bottom chamfer 224a, 324a (i.e. it looks flat in a plane containing the radial direction and the longitudinal axis such as the sectioned plane of FIGS. 4 and 6, but three dimensionally would be at least partially conical). Likewise, a top blend 326 may connect the upper land 320 to the first piston ring receiving groove 318 (see FIG. 6).

Focusing on FIGS. 4 and 6, it can be understood that the circumferential annular wall 214, 314 further defines a second piston ring receiving groove 228, 328 that is disposed axially between the top squish surface 212, 312, and the first piston ring receiving groove 218, 318. Similarly, the circumferential annular wall 214, 314 may further define an oil groove 230, 330 that is disposed axially below the first piston ring receiving groove 218, 318. These auxiliary grooves may not be present in other embodiments of the present disclosure.

When present, the second piston ring receiving groove 228, 328 may be spaced axially away from the top squish surface 212, 312 a first axial distance 232, 332 that may range from 3.0 mm to 12.0 mm, forming a first cylindrical land surface 234, 334 defining a first diameter 236, 336 (see FIGS. 3 and 5) that may range from 168.0 mm to 170.0 mm in some embodiments. Also, the second piston ring receiving groove 228, 328 may define a second piston ring receiving groove axial width 238, 338 (see FIGS. 4 and 6) that may range from 2.0 mm to 5.0 mm, and a second piston ring receiving groove minimum diameter 240, 340 (see FIGS. 3 and 5) that may range from 154.0 mm to 161.0 mm in some embodiments.

Looking at FIGS. 4 and 6, the first piston ring receiving groove 218, 318 may be spaced axially away from the second piston ring receiving groove 228, 328 a second axial distance 242, 342 that may range from 3.0 mm to 12.0 mm, forming a second cylindrical land surface 244, 344, defining a second diameter 246, 346 (see FIGS. 3 and 5) that may range from 168.0 mm to 170.0 mm in some embodiments. Also, the first piston ring receiving groove 218, 318 may define a first piston ring receiving groove axial width 248, 348 (see FIGS. 4 and 6) that may range from 2.0 mm to 5.0 mm, and a first piston ring receiving groove minimum diameter 250, 350 that may range from 154.0 mm to 161.0 mm (as best seen in FIGS. 3 and 5) in some embodiments.

In addition, as best seen in FIGS. 4 and 6, the oil groove 230, 330 may be spaced axially away from the first piston ring receiving groove 218, 318 a third axial distance 252, 352 that may range from 3.0 mm to 12.0 mm, forming a third cylindrical land surface 254, 354 defining a third diameter 256, 356 that may range from 168.0 mm to 170.0 mm (see FIGS. 3 and 5) in some embodiments. Also, the oil groove 230, 330 may define an oil groove axial width 258, 358, that may range from 2.0 mm to 5.0 mm (see FIGS. 4 and 6), and an oil groove minimum diameter 260, 360 ranging from 154.0 mm to 162.0 mm (see FIGS. 3 and 5) in some embodiments.

Moreover in FIGS. 3 and 5, the circumferential annular wall 214, 314 further defines a bottom cylindrical surface 262, 362 that is disposed axially below the oil groove 230, 330, defining a fourth diameter 264, 364 that may range from 165.0 mm to 170.0 mm in some embodiments.

It is contemplated that these various features may be differently configured and dimensioned than just described in other embodiments of the present disclosure.

A piston 200, 300 that may be provided as replacement part for particular applications will now be discussed with reference to FIGS. 3 thru 6.

In FIGS. 4 and 6, the circumferential annular wall 214, 314 may define a first groove 228a, 328a that is spaced axially away from the top squish surface 212, 312, forming a first land 268, 368, and a second groove 218a, 318a spaced axially away from the first groove 228a, 328a, forming a second land 220a, 320a. Also, at least a bottom chamfer 224a, 324a extends axially, and radially from the second groove 218a, 318a.

Also as shown in FIGS. 3 and 5, a connecting rod attachment portion 270, 370 may extend axially downwardly from the crown portion 204, 304. This connecting rod attachment portion 270, 370 typically has a bore for receiving a pin that passes through the bore and through the connecting rod. This connection is not shown in the drawings, but is to be understood to be present in operation in FIG. 2.

In FIGS. 4 and 6, the crown portion 204, 304 may further define a third groove 230a, 330a that is spaced axially away from the second groove 218a, 318a, forming a third land 222a, 322a. The bottom chamfer 224a, 324a extends radially and axially from the third land 222a, 322a to the second groove 218a, 318a.

In FIGS. 3 and 5, the skirt 216, 316 may define a skirt circumferential extent 216a, 316a and the bottom chamfer 224a, 324a may be disposed axially above the skirt 216, 316. In such a case, the bottom chamfer 224a, 324a may extend circumferentially at least as much as the skirt circumferential extent 216a, 316a.

In FIG. 3, the bottom chamfer 224a extends completely circumferentially about the longitudinal axis 206 an angular amount of 360 degrees. In FIG. 5, the bottom chamfer 324a extend circumferentially about the longitudinal axis 306 an angular amount that is less than 180 degrees. It is to be understood that one or more chamfers may be on the other side (blind side) of the piston 300. In such a case, the piston may define two planes of symmetry (one of which may be the sectioned plane of FIGS. 4 and 6) that contain the radial direction, and the longitudinal axis, and which are perpendicular to each other. This may not be the case for other embodiments of the present disclosure.

As shown in FIGS. 4 and 6, the sectioned plane shown contains the radial direction 208, 308, and the longitudinal axis 206, 306. Also, the bottom chamfer 224a, 324a defines an angle 272, 372 with the radial direction in the plane that ranges from 40 degrees to 50 degrees (e.g. 45 degrees). In such a case, the bottom chamfer 206, 306 (or the top chamfer 326a) defines a radial distance 280, 38 (i.e. a distance measured in the radial direction) in the plane that ranges from 0.25 mm to 0.75 mm (e.g. 0.5 mm). Other configurations and dimensional ranges are possible in other embodiments of the present disclosure. In FIG. 6, the top chamfer 326a has geometry that is mirrored or symmetrical to that of the bottom chamfer 206, 306 about a groove midplane 374 that is perpendicular to the longitudinal axis 306. This may not be the case for other embodiments of the present disclosure.

Yet another embodiment of a piston 200, 300 that may be provided as a replacement part may be characterized as follows.

In FIGS. 4 and 6, the circumferential annular wall 214, 314 may define a first groove 228a, 328a that is spaced axially away from the top squish surface 212, 312, forming a first land 268, 368, and a second groove 218a, 318a spaced axially away from the first groove 228a, 328a, forming a second land 220a, 220b. At least a first chamfer (e.g. 224a, 324a, 326a) extends axially, and radially from the second groove 218a, 318a.

In FIG. 6, a first chamfer and a second chamfer (e.g. bottom chamfer 324a, top chamfer 326a). Both may extend axially, and radially from the second groove 218a, 318a, both extend may the same circumferential extent 327 about the longitudinal axis 306 ranging from 110 degrees to 130 degrees (e.g. 120 degrees).

More particularly as best seen in FIG. 5, the top chamfer 326a, and the bottom chamfer 324a are disposed axially above the skirt 316, and have a maximum size in a plane that includes the radial direction and the longitudinal axis (e.g. the sectioned plane of FIG. 6), and decrease in size when approaching an extremity 376 of the circumferential extent 327 (see FIG. 5). This may be modeled using computer aided drafting software via a variable blend function. Other configurations are possible in other embodiments of the present disclosure.

As used herein, "arcuate" includes any shape that is not straight or flat including a radius, an ellipse, a polynomial, a spline, etc. As used herein, the term "blend" may include any suitable geometry including a chamfer (having a flat or conical shape), a radius or other arcuate curve segment(s) that serve the function of a chamfer to break an edge as described herein. In any embodiment discussed herein, a chamfer may be substituted for a blend or vice versa.

The configuration and dimensional ranges of any of the embodiments discussed herein may be altered to be different depending on the application.

The piston may be fabricated from steel, cast aluminum alloy, forged aluminum alloy or other suitable material that is durable, corrosion resistant, etc. The geometry of the crown portion may be formed during the casting or forging process and then may be rough machined and/or finish machined if necessary. Suitable machining processes may include milling, turning, electrical discharge machining, etc.

INDUSTRIAL APPLICABILITY

In practice, a piston, a crown portion of a piston, and/or an engine assembly using such a piston or crown portion of a piston according to any embodiment described herein may be provided, sold, manufactured, and bought etc. as needed or desired in an aftermarket or OEM (original equipment manufacturer) context. For example, a crown portion or a piston may be used to retrofit an existing engine already in the field or may be sold with an engine or a piece of equipment using that engine at the first point of sale of the piece of equipment.

Figure 7:
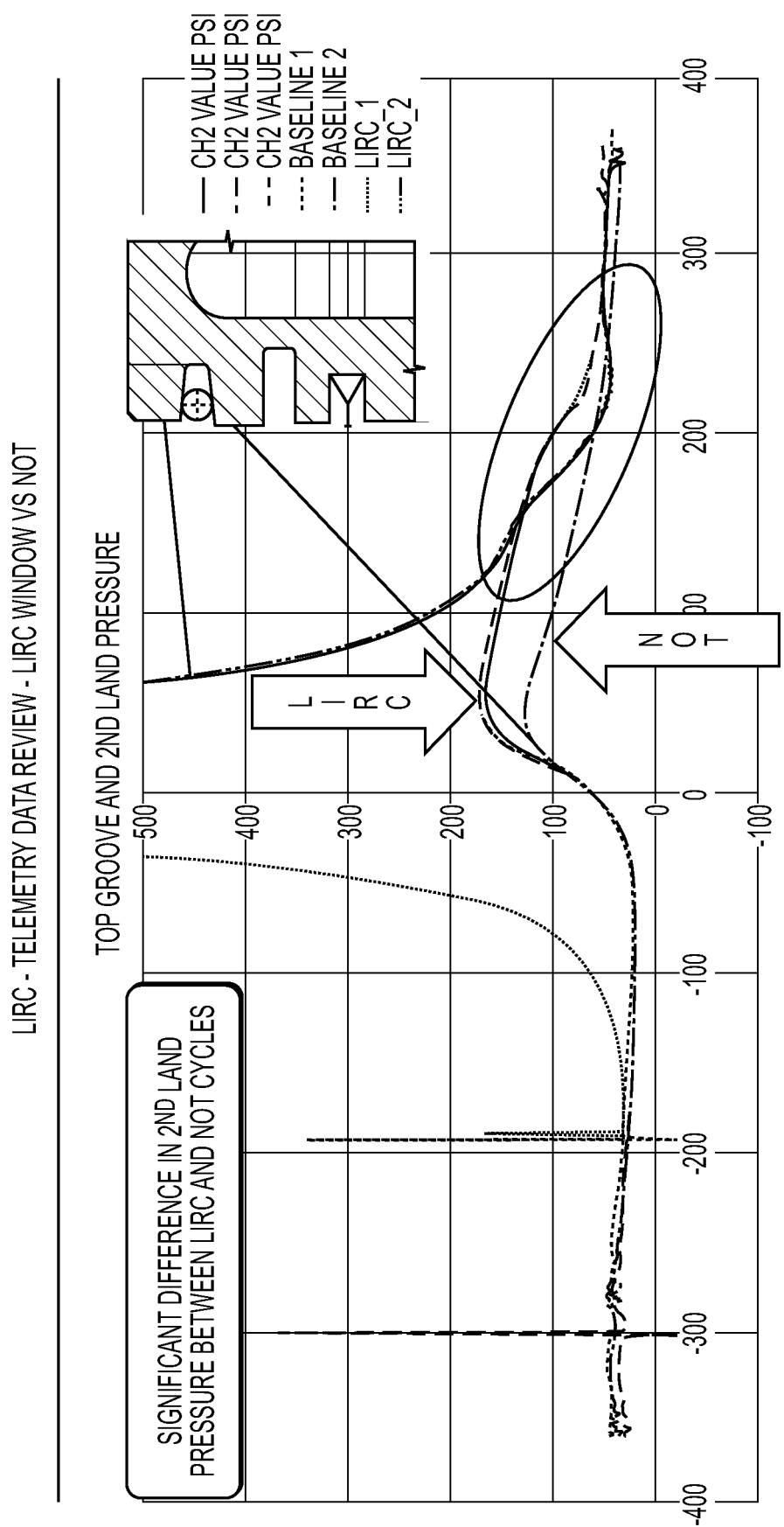
FIG. 7 is a graph showing the reduction in top groove and second land pressures according to various embodiments of the present disclosure.

FIG. 7 indicates that when various embodiments of pistons such as those shown in FIGS. 3 thru 6 are used in an engine, the second land pressures are reduced due to the venting of the second land by the chamfered groove. So, LIRC cycles are changed to cycles where this phenomenon does not happen. More specifically, the vertical axis represents pressures while the horizontal axis represents the crank angle. The peak pressures at the crank angle range of 0 to 100 degrees are reduced.

Figure 8:
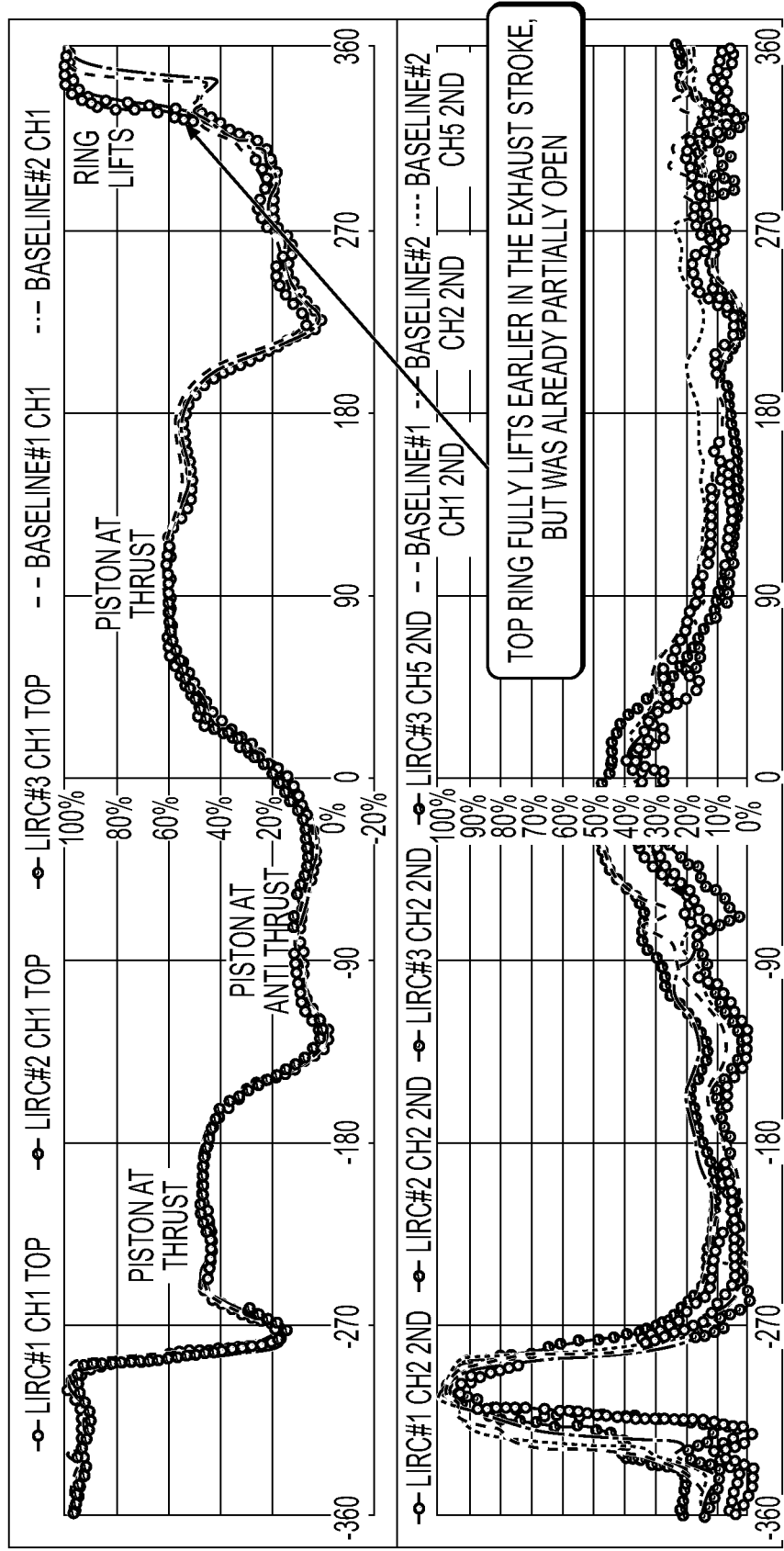
FIG. 8 is a graph showing the comparable performance of ring lift of various embodiments of the present disclosure versus other prior designs.

Similarly, FIG. 8 shows ring lift at various crank angles during a full engine cycle (top portion shows top ring lift while the lower portion shows the lower or second ring lift). As can be seen, FIG. 8 indicates that the top piston ring in the top piston ring groove lifts while the second piston ring in the second piston ring groove. This may be attributed to the reduce pressures at the second land of the piston.

Given these results, one skilled in the art would expect that various embodiments of the piston of the present disclosure would reduce the likelihood of LIRC, and the associated higher emissions from oil burning, higher oil consumption, and increased piston deposits. That is to say, the various embodiments of the piston of the present disclosure may decrease these deleterious effects.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A piston configured to reciprocate in the bore of an engine,
the piston comprising:
an annular body including a crown portion defining a longitudinal axis, a radial direction perpendicular to the longitudinal axis, and a circumferential direction, the annular body including
a top squish surface of the crown portion, and a circumferential annular wall extending downwardly axially from the top squish surface; and
a skirt extending downwardly axially from the circumferential annular wall;
wherein the circumferential annular wall defines a first groove that is spaced axially away from the top squish surface, forming a first land, and a second groove spaced axially away from the first groove, forming a second land, and a bottom blend extending axially, and radially from the second groove, and the skirt defines a skirt circumferential extent and the bottom blend is disposed axially above the skirt and extends circumferentially at least as much as the skirt circumferential extent but less than 360 degrees.

2. The piston of claim 1 further comprising a connecting rod attachment portion extending from the crown portion, and wherein the crown portion further defines a third groove that is spaced axially away from the second groove, forming a third land, and the bottom blend extends radially and axially from the third land to the second groove.

3. The piston of claim 1 wherein the annular body defines a plane that contains the radial direction and the longitudinal axis, and the bottom blend is a bottom chamfer that defines an angle with the radial direction in the plane that ranges from 40 degrees to 50 degrees.

4. The piston of claim 3 wherein the bottom chamfer defines a radial distance in the plane that ranges from 0.08 mm to 1.5 mm.

5. A piston configured to reciprocate in the bore of an engine, the piston comprising:
an annular body including a crown portion defining a longitudinal axis, a radial direction perpendicular to the longitudinal axis, and a circumferential direction, the annular body including
a top squish surface of the crown portion, and a circumferential annular wall extending downwardly axially from the top squish surface; and
a skirt extending downwardly axially from the circumferential annular wall defining a skirt circumferential extent;
wherein the circumferential annular wall defines a first groove that is spaced axially away from the top squish surface, forming a first land, and a second groove spaced axially away from the first groove, forming a second land, and a first blend extending axially, and radially from the second groove a circumferential extent about the longitudinal axis that is less than 360 degrees.

6. The piston of claim 5 wherein the annular body further defines a second blend extending axially, and radially from the second groove.

7. The piston of claim 6 wherein the first blend is a top chamfer that extends axially, and radially from the second land, and the second blend is a bottom chamfer that extends axially and radially from a third land.

8. The piston of claim 7 wherein the top chamfer and the bottom chamfer both extend the same circumferential extent about the longitudinal axis ranging from 110 degrees to 130 degrees.

9. The piston of claim 8 wherein the top chamfer and the bottom chamfer are disposed axially above the skirt, and have a maximum size in a plane that includes the radial direction and the longitudinal axis, and decrease in size when approaching an extremity of the circumferential extent.

10. A piston configured to reciprocate in the bore of an engine, the piston comprising:
   an annular body including a crown portion defining a longitudinal axis, a radial direction perpendicular to the longitudinal axis, and a circumferential direction, the annular body including
   a top squish surface of the crown portion, and a circumferential annular wall extending downwardly axially from the top squish surface; and
   a skirt extending downwardly axially from the circumferential annular wall;
   wherein the circumferential annular wall defines a first piston ring receiving groove that is spaced away from the top squish surface, an upper land extending from the first piston ring receiving groove, and a lower land extending from the first piston ring receiving groove, and only a bottom blend connecting the lower land to the first piston ring receiving groove and extends circumferentially at least as much as the skirt circumferential extent but less than 360 degrees.

11. The piston of claim 10 wherein the bottom blend is a bottom chamfer.

12. The piston of claim 11 wherein the circumferential annular wall further defines a second piston ring receiving groove disposed axially between the top squish surface and the first piston ring receiving groove.

13. The piston of claim 12 wherein the circumferential annular wall further defines an oil groove disposed axially below the first piston ring receiving groove.

14. The piston of claim 13 wherein the second piston ring receiving groove is spaced axially away from the top squish surface a first axial distance ranging from 3.0 mm to 12.0 mm, forming a first cylindrical land surface defining a first diameter ranging from 168.0 mm to 170.0 mm, and the second piston ring receiving groove defines a second piston ring receiving groove axial width ranging from 2.0 mm to 5.0 mm, and a second piston ring receiving groove minimum diameter ranging from 154.0 mm to 161.0 mm.

15. The piston of claim 14 wherein the first piston ring receiving groove is spaced axially away from the second piston ring receiving groove a second axial distance ranging from 3.0 mm to 12.0 mm, forming a second cylindrical land surface defining a second diameter ranging from 168.0 mm to 170.0 mm, and the first piston ring receiving groove defines a first piston ring receiving groove axial width ranging from 2.0 mm to 5.0 mm, and a first piston ring receiving groove minimum diameter ranging from 154.0 mm to 161.0 mm.

16. The piston of claim 15 wherein the oil groove is spaced axially away from the first piston ring receiving groove a third axial distance ranging from 3.0 mm to 12.0 mm, forming a third cylindrical land surface defining a third diameter ranging from 168.0 mm to 170.0 mm, and the oil groove defines an oil groove axial width ranging from 2.0 mm to 5.0 mm, and an oil groove minimum diameter ranging from 154.0 mm to 162.0 mm.

17. The piston of claim 16 wherein the circumferential annular wall further defines a bottom cylindrical surface that is disposed axially below the oil groove, defining a fourth diameter ranging from 165.0 mm to 170.0 mm.

* * * * *